Jan. 20, 1953  G. E. ARNIO  2,626,022
FOOT AND HAND BRAKE FOR FARM TRACTORS
Filed Sept. 9, 1948  2 SHEETS—SHEET 1

George E. Arnio
INVENTOR.

BY *Clarence A. O'Brien*
*and Harvey B. Jackson*
Attorneys

Jan. 20, 1953   G. E. ARNIO   2,626,022
FOOT AND HAND BRAKE FOR FARM TRACTORS
Filed Sept. 9, 1948   2 SHEETS—SHEET 2
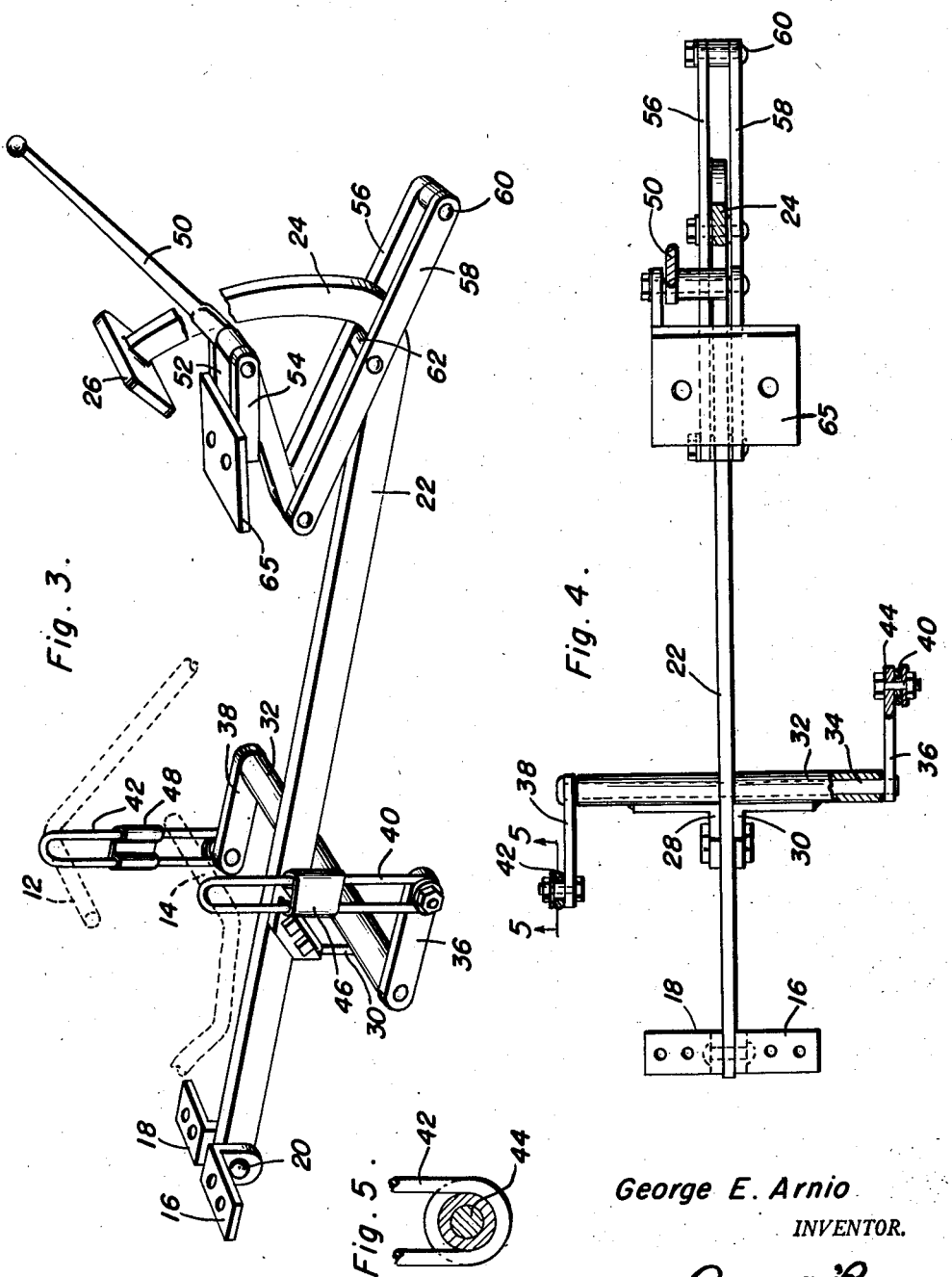
George E. Arnio
INVENTOR.

Patented Jan. 20, 1953

2,626,022

UNITED STATES PATENT OFFICE 2,626,022

FOOT AND HAND BRAKE FOR FARM TRACTORS

George E. Arnio, Oneonta, N. Y.

Application September 9, 1948, Serial No. 48,506

5 Claims. (Cl. 188—204)

An object of this invention is to provide for the self-equalizing of power applied to the actuating rods of the brakes for the wheels of a vehicle whether it be a farm type tractor or motor vehicle, by means of a mechanism responsive to the force necessary for depressing one or more brake actuation arms.

Another purpose of this invention is to provide a depressible foot brake lever, thereby rotatively actuating a rocker shaft which is mounted for rotation on the said foot brake lever and also pivoting the said rocker shaft bodily with the foot brake lever, the actual rotation of the rocker shaft being responsive to the force necessary to overcome the resistance of one of two or more brake actuation rods, operatively connected with the brake system of a vehicle.

Another purpose of this invention is to perform a similar operation by means of a hand brake lever or member which has means associated therewith for imparting pivotal movement of the hand lever to pivotal movement of the brake lever.

Another object of this invention is to apply to the conventional brake actuating rods a substantially equalized brake application force, without the necessity of complicated mechanisms within the actual wheel assemblies, which is impractical for rough, heavy duty service such as entailed even in the smallest of conventional farm tractors.

Ancillary objects and features of novelty such as simplicity of structure will become apparent to those skilled in the art, in following the description of the preferred form of the invention, illustrated in the accompanying drawings, wherein:

Figure 3 is a perspective view of the operative elements forming the invention drawn to a larger scale;

Figure 4 is a sectional view taken substantially on the line 4—4 of Figure 1 and in the direction of the arrows and drawn to a larger scale; and Figure 5 is a sectional view taken on the line 5—5 of Figure 4 and in the direction of the arrows.

Figure 1:
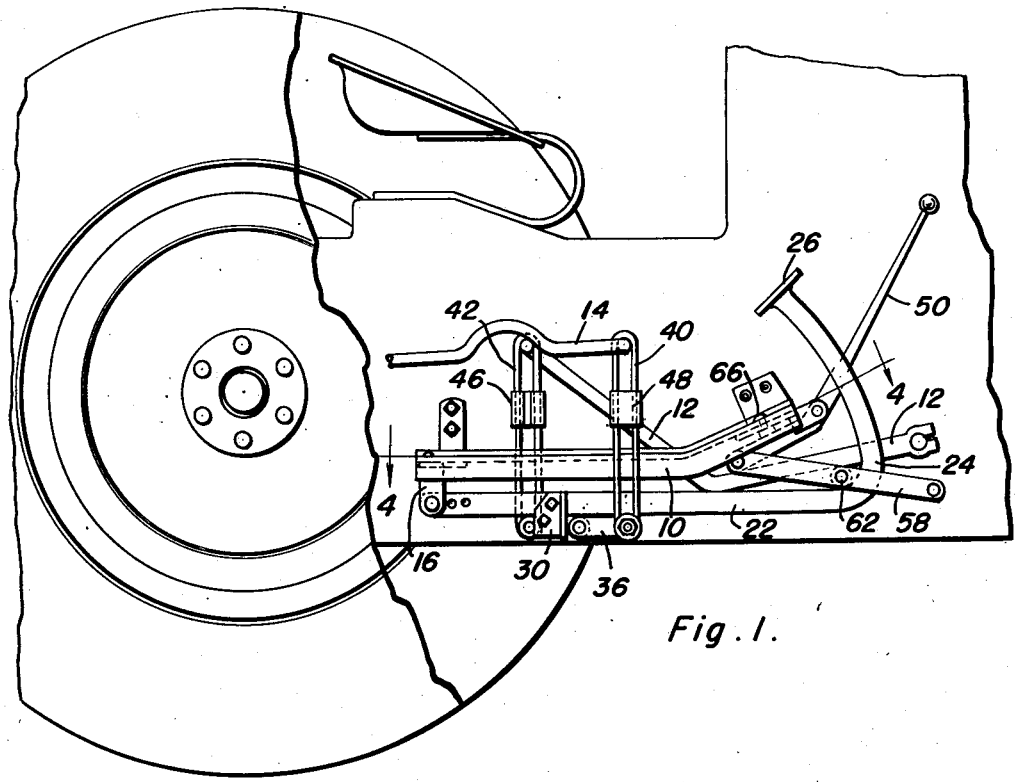
Figure 1 is an elevational side view of a conventional tractor, portions being broken away to illustrate details of construction.
Figure 2:
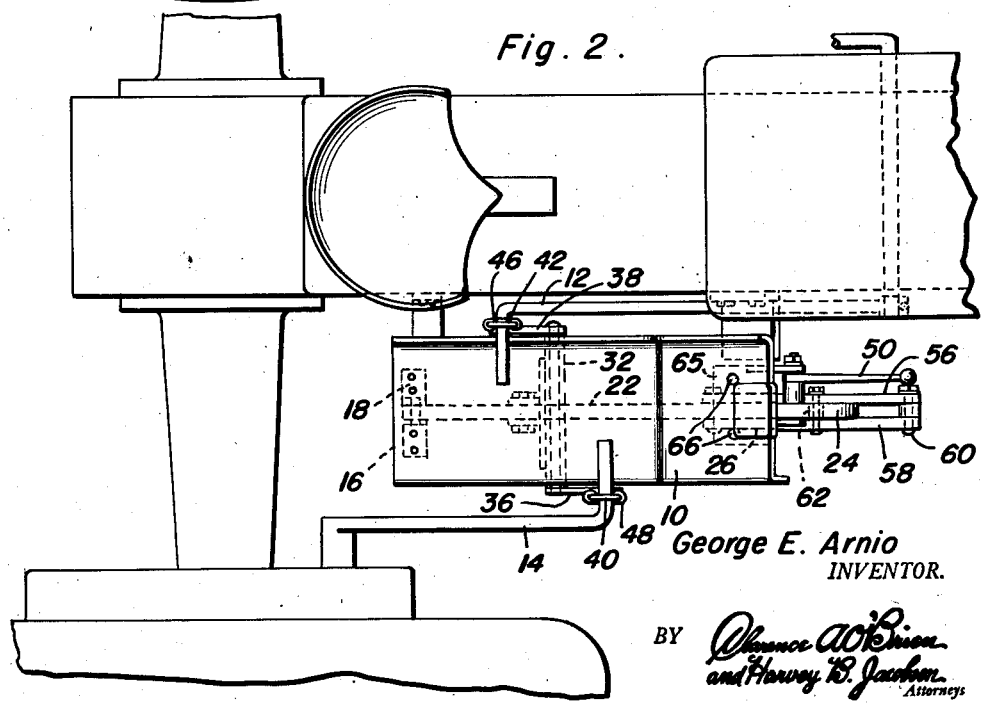
Figure 2 is a plan view of the device shown in Figure 1.

The specific structure for performing the previously enumerated objects as well as many others includes certain conventional mechanism, such as the step plate schematically shown at 10 in Figures 3 and 4 and shown realistically in Figures 1 and 2. Conventional brake actuation rods 12 and 14, respectively, having bent end portions are illustrated, forming a portion of the conventional mechanism of a tractor. Actuation of these rods, in turn, actuate the conventional brake shoes of the wheels of a tractor.

A bracket 16 is rigidly attached to a suitable component of the tractor and has a complemental bracket 18 thereadjacent. A pivot pin 20 extends through the said bracket, pivotally supporting a foot brake lever 22. This foot brake lever has a curved front portion 24, terminating in a conventional brake pedal 26. It is now readily apparent that application of a force on the brake pedal will pivotally actuate the brake lever 22.

A pair of brackets 28 and 30, respectively, are attached to the foot brake lever 22 by suitable, conventional means such as bolts, welding, brazing or the like. A sleeve 32 is attached to flanges of the said brackets 28 and 30 rigidly, as by welding or brazing or other means and rotatively supports a rocker shaft 34. This rocker shaft is capable of rotative movement in the sleeve type bearing 32 and has an arm 36 at one end thereof and a second arm 38 at the opposite end thereof. It is seen that the said arms 36 and 38 respectively are directed oppositely.

The operation thus far defined is as follows: A force is applied to the brake pedal 26, which is, in turn, imparted to rotative movement of the brake lever 22. This carries the sleeve and shaft 32 and 34, respectively, in a pivotal manner therewith.

A lost motion connection is supplied at the free ends of the said arms 36 and 38, respectively, connecting the actuation rods 12 and 14 to the arms 36 and 38. The preferable lost motion connection may be seen as a pair of identical bales 40 and 42, respectively, having their curved end portions retained at the ends of each arm 36 and 38 through the medium of conventional bolts 44, nuts and washers. It is seen that the bales may, if desired, be adjusted as to effective lengths, this being an expediency contemplated by the present invention.

In order to prevent the bales from excessive spreading, the supports 46 and 48, respectively, are supplied with curved portions, receiving legs of the bales therein.

The opposite ends of the said bales simply retain the brake actuation rods 12 and 14 therein.

It is readily appreciated that in practical operation the brake shoes of tractors or other vehicles are substantially always out of perfect adjustment. Accordingly, it will require more or less force to urge one or the other of the brake actuation rods 12 or 14, respectively. Assume that the brake shoes appurtenant to the brake actuation rod 12 are relatively close to the brake drums and that the slack in the linkages and the like connecting the brake actuation rod 12 and the shoes is identical to that in conjunction with the brake actuation rod 14. Thus, the resistance to movement of the brake actuation rod 12 will be greater than that involved in the movement of the brake actuation rod 14. Accordingly, upon depression of the pedal 26 and pivotal movement of the brake lever 22, the entire assembly will tend to rotate pivotally about the pin 20. However, this rotation will be impeded by the resistance set up by the brake actuation rod 12. Consequently, the upper portion of the bale 42 will remain relatively stationary while the bale 40 is depressed rapidly due to the crank-like shape assumed by the rocker shaft and arms 36 and 38, respectively. The said rocker shaft 34 will rotate slightly until such time that the force required to depress the brake actuation rod 12 is substantially equal to that required to press the brake actuation rod 14 (the brake shoes appurtenant thereto having contacted the appurtenant brake drums). At that time rotative movement of the rocker shaft is stopped and substantially the only movement involved with respect to the brake actuation rods 12 and 14 is derived through the pivotal movement of the brake lever 22.

In order to actuate the brake shoes in synchronism as described above by means of a hand lever brake member 50, a pair of perches 52 and 54 are utilized to mount said brake member 50 for pivotal movement. The perches 52, 54 extend rigidly from a plate 65 bolted, as at 66, to the underside and front end of the step plate 10. This brake lever 50 is in reality a crank pivoted between the ends thereof and having at one end a pair of rods 56 and 58, respectively. These rods are pivotally attached at one end to an end of the said hand lever brake member 50 and have a spacing pin 60 utilized at the opposite end. A pin 62 is mounted between the rods 58 and 56 which flank the said brake lever adjacent the curved or bent portion 24 thereof. It is readily appreciated that upon pivotal movement of the hand lever brake member 50, the lower end thereof contacts the brake lever 22 causing pivotal movement thereof in order to initiate the cycle of operation described above. The rods 56 and 58 constitute guides for the brake lever 22 and also the brake member 50.

It is apparent that variations may be made without departing from the spirit of the invention. Accordingly, limitation is sought only in accordance with the scope of the following claims.

Having described the invention, what is claimed as new is:

1. A device for operating the brakes of a vehicle which includes a first and second brake actuation rod comprising a pivoted brake lever having means rotatively mounted thereon responsive to the differential of force required to depress the actuation rods for actuating said actuation rods in synchronism, said means including a rocker shaft mounted for rotation on said brake lever, arms attached to the ends of said rocker shaft, and lost motion means connecting said arms directly to the actuation rods.

2. A device for operating the brakes of a vehicle which includes a first and second brake actuation rod comprising a pivoted brake lever having means rotatively mounted thereon responsive to the differential of force required to depress the actuation rods for actuating said actuation rods in synchronism, said means including a rocker shaft mounted for rotation on said brake lever, arms attached to said rocker shaft and lost motion means connecting said links to the actuation rods, said last mentioned means including bales adjustably attached adjacent the ends thereof to said arms and engaging said actuation rods at the opposite ends.

3. The combination of claim 2, and one of said bales being attached forwardly of said rocker shaft and the other of said bales being attached rearwardly of said rocker shaft.

4. The combination of claim 3 and a selectively operable hand brake member mounted for pivotal movement on a vehicle component, and means pivotally secured to said hand brake member for imparting pivotal movement of said hand brake member to pivotal movement of said brake lever.

5. The combination of claim 4, and said last-mentioned means including a pair of rods flanking said brake lever and a pin attached to said pair of rods engaging and guiding said brake lever.

GEORGE E. ARNIO.

REFERENCES CITED

The following references are of record in the file of this patent:

UNITED STATES PATENTS

| Number | Name | Date |
|---|---|---|
| 1,379,111 | Lucand | May 24, 1921 |
| 1,560,037 | Bushey | Nov. 3, 1925 |